Sept. 14, 1943.     F. L. STEGHART     2,329,423
AMPLIFIER SYSTEM
Filed Dec. 11, 1940     3 Sheets-Sheet 1

INVENTOR
Fritz Ludwig Steghart
By his ATTY.

Sept. 14, 1943.        F. L. STEGHART        2,329,423
              AMPLIFIER SYSTEM
        Filed Dec. 11, 1940        3 Sheets-Sheet 2
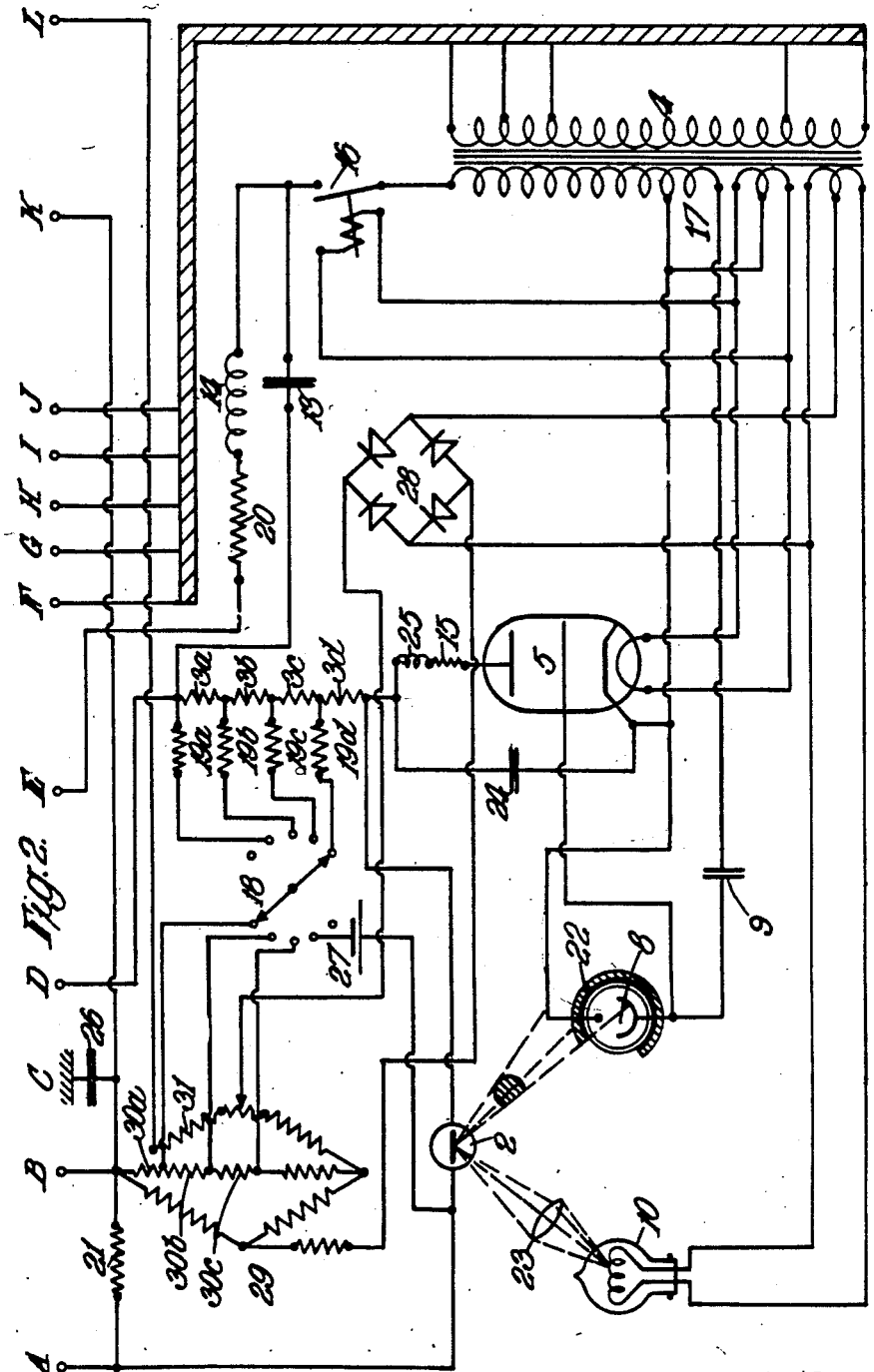
INVENTOR
Fritz Ludwig Steghart
By Otto Munk
his ATTY.

Sept. 14, 1943. F. L. STEGHART 2,329,423
AMPLIFIER SYSTEM
Filed Dec. 11, 1940   3 Sheets-Sheet 3
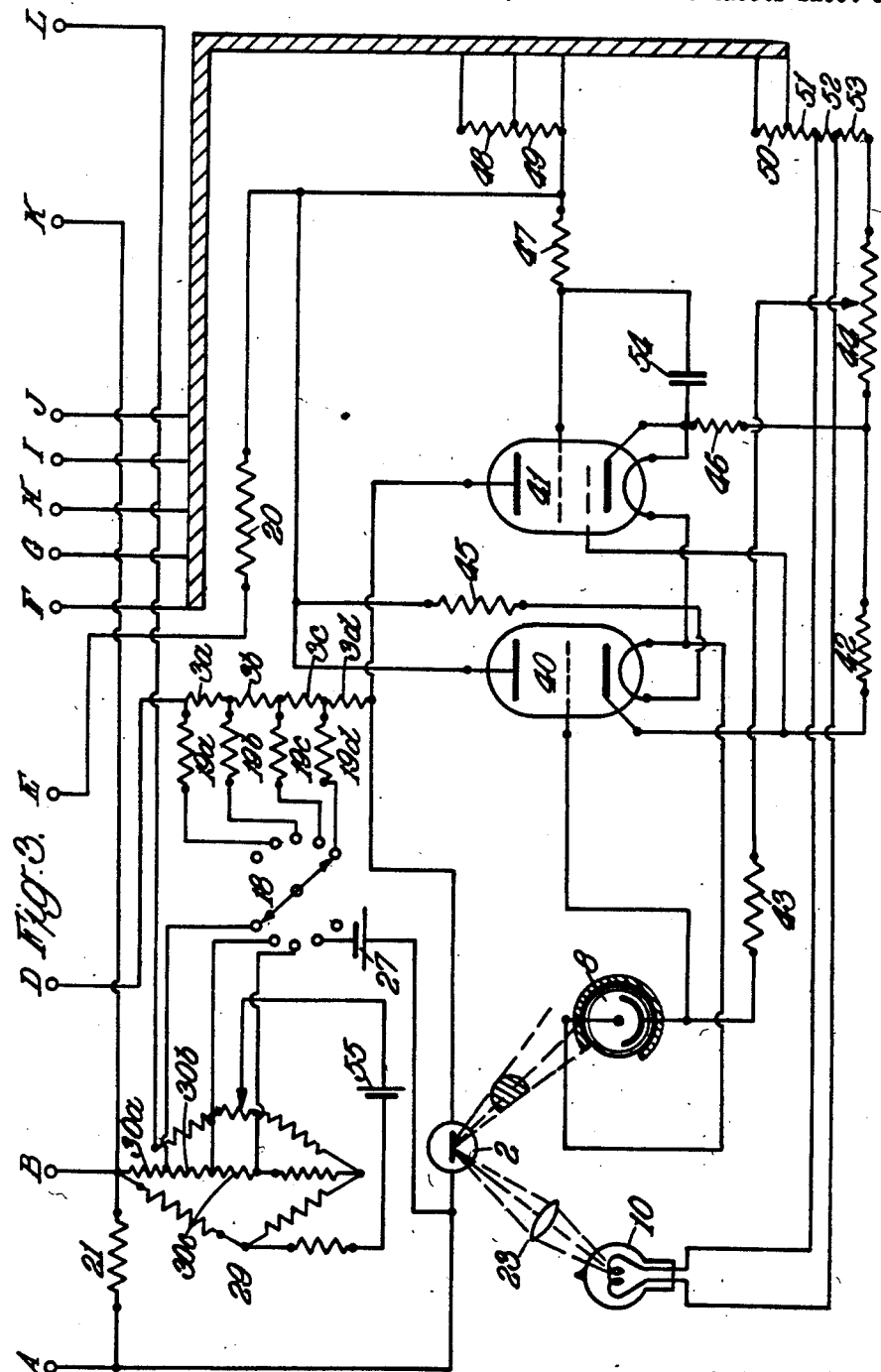
INVENTOR
Fritz Ludwig Steghart
By [signature]
his ATTY.

Patented Sept. 14, 1943

2,329,423

UNITED STATES PATENT OFFICE 2,329,423

AMPLIFIER SYSTEM

Fritz Ludwig Steghart, London, England, assignor of one-half to Douglas Crisp Gall, London, England Application December 11, 1940, Serial No. 369,526
In Great Britain December 30, 1939

20 Claims. (Cl. 250—27)

This invention relates to improvements in valve amplifiers for small direct currents and voltages and has for its object to improve such amplifiers to obtain uniform stability over full range of amplification with a large amplification to enable robust measuring and/or recording instruments to be used.

The foregoing and further features of the invention will be apparent from the following description as defined in the appendant claims.

More generally, the invention employs two circuits which are in metallic connection, of which the first circuit contains the source of voltage which is to be measured, a reflected light galvanometer and a resistance which is independent of temperature, and of which the second circuit contains a source of alternating current supply, a gas filled triode valve and indicating, recording and/or integrating instruments together with suitable electrical means such as resistances, chokes and the like to adapt the circuit to particular requirements. For governing the amplification of the valve the second circuit also contains a photo-electric cell and a condenser, together with a source of light and for controlling the valve means are provided for stopping the flow of anode current over part of the positive half wave and for changing the peak value of the anode current. A thermal delay switch may also be incorporated in the valve circuit to prevent anode current flowing before the cathode is hot.

It is preferred that the galvanometer be highly sensitive and highly damped and it is, for preference, of the suspension type when the suspension is desirably made so taut that the instrument loses some of its sensitivity. The galvanometer may also be provided with means for limiting the movement of the reflecting mirror.

The photo-electric cell may be of gas filled or vacuum or surface sensitive type, although it is preferred to employ an argon filled caesium layer on silver oxide type. Means are also desirably provided for screening the light falling on the photo-cell and, in addition, optical grids or slotted masks may be provided in the light circuit in order to increase the sensitivity of the amplifier.

In order that the invention may be clearly understood and readily carried into effect, the same is hereinafter more fully described with reference to the accompanying drawings which are given by way of example only and not of limitation.

In these drawings:

Figure 2 is a more complete operative circuit diagram of the same form of the invention, and Figure 3 is similar to Figure 2 showing another form of the invention.

Figure 1:
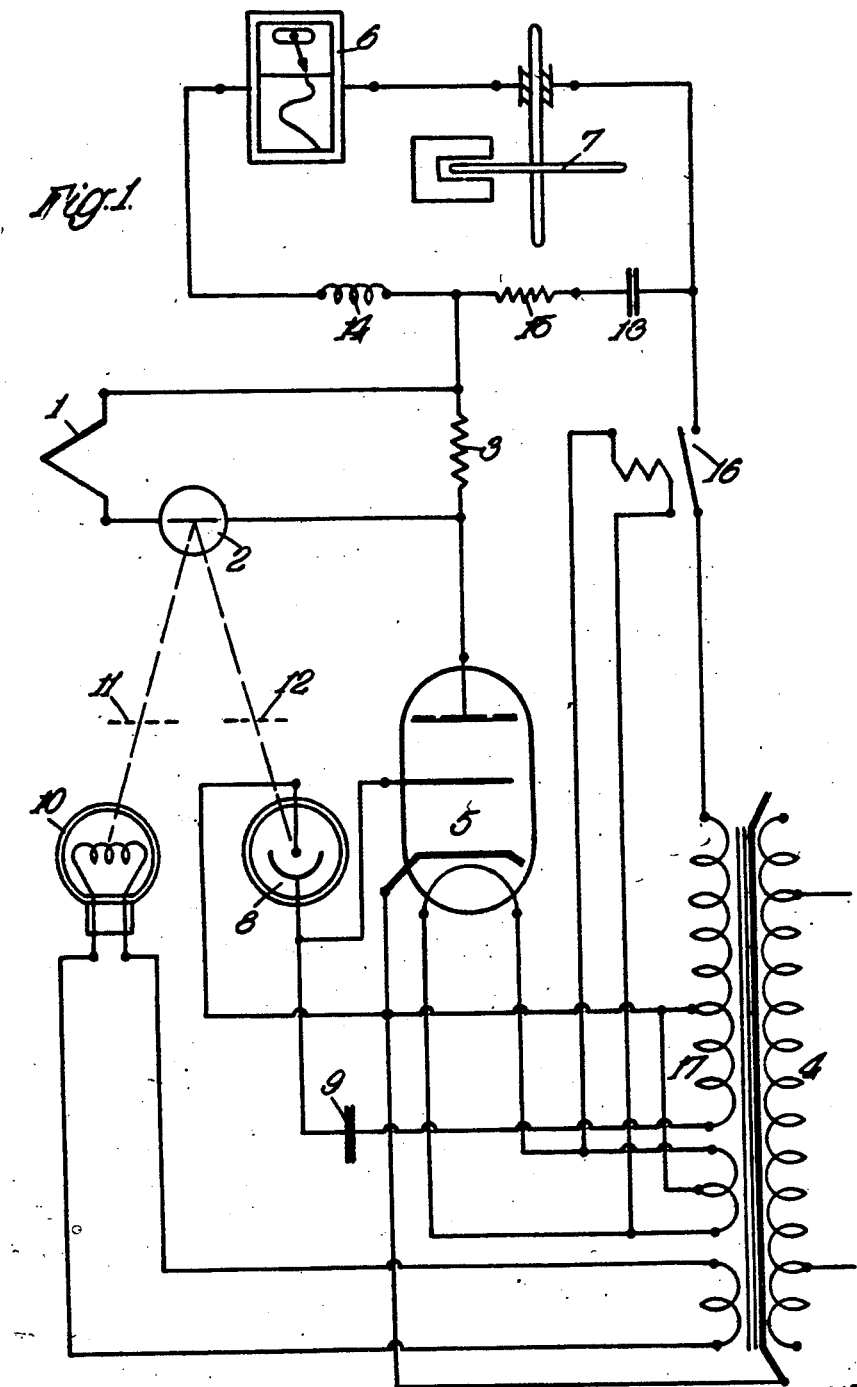
Figure 1 is a simplified circuit diagram of one form of the invention.

In the description which follows like parts are, for convenience, designated by like reference numerals, and in both examples the invention is described with reference to its use with mains supply as the source of operating current and, whilst the examples show, as a source of current to be measured, a thermo-couple, it is to be understood that other sources of weak direct current or alternating current voltages which it is desired to measure may be substituted therefor.

Referring now to Figure 1 of the said drawings, the first circuit contains the thermo-couple 1, the galvanometer 2 and the standard resistance 3. The second circuit contains the secondary winding of the transformer 4 also a gas discharge triode 5, the recorder 6 and the meter 7. For the control of the gas discharge triode 5, this second circuit also contains a photo-electric cell 8 and a condenser 9 fed from a separate winding 17 of the transformer 4.

Other windings supply the cathode of the gas discharge triode 5 and also the lamp 10, the light of which is reflected by the mirror of the galvanometer 2 onto the photo-cell 8. If the current to be measured is very small, two optical grids or masks 11 and 12 can be provided. In this way the sensitivity of the arrangement is increased by a factor equal to the number of slots in the grids or masks. To smooth out and stabilise the second (output) circuit, a condenser 13 and a choke 14 are provided. The resistance 15 limits the discharge current of the condenser 13. A thermal delay switch 16 prevents anode current from flowing before the cathode is hot.

The unit is entirely supply mains operated. The gas discharge valve 5 acts as a grid controlled rectifier and passes anode current only if the grid voltage is less negative than a certain critical voltage dependent upon the instantaneous anode voltage. The relation between the grid and anode potential of such a circuit is determined by the valve characteristic. The lower the grid voltage, the sooner will the gas discharge triode trigger, in the positive half cycle, and the greater will be the main rectified D. C. through the instrument. The grid voltage of the gas discharge triode 5 is determined by a bridge circuit arrangement. The grid is connected through a small condenser 9 to a point more negative than the cathode. The grid is also connected to the cathode through the photo-cell 8, the polarity of which is such that the photo-cathode is negative when the valve anode is positive; therefore, the grid potential relative to the cathode is determined by the relative impedances of the condenser and photo-cell. Since the impedance of the photo-cell 8 depends upon the light intensity falling on the photo-cathode, the grid voltage and, hence, the rectified anode current through the gas discharge valve in the second circuit, containing the standard resistance 3 and the recorder 6 will be dependent upon the amount of light falling on the cell.

In addition, there is a phase control effect, inasmuch as there is a lag between the phasing of anode and grid voltages caused by the relative capacities of the condenser 9 and photo-cell 8 which form the bridge circuit. Hence, the portion of the half cycle, during which the gas discharge triode passes anode current, is further reduced and the main D. C. will be smaller than would be the case if the photo-cell 8 and the condenser 9 are used as pure resistances.

The voltage of the thermo-couple 1 which is to be measured, deflects the galvanometer 2 in the first circuit and increases the light on the photo-cell 8 and, therefore, the current in the second circuit until the voltage across the standard resistance 3 is equal and contrary to the voltage of the thermo-couple 1. The recorder 6 and the meter 7, therefore, carry a current which is exactly proportional to the voltage of the thermo-couple 1. Any change in this voltage is followed by the current in the output circuit almost instantaneously. Therefore, a high speed ink recorder may be used. As a very small standard resistance may be chosen, the necessary current in the second circuit, in order to compensate the first voltage, may be very large. The amplification depends solely upon the choice of the standard resistance 3. The accuracy of this amplifier is extremely high and even with a distance of a few inches only between galvanometer and photo-cell, voltages of the order of a millivolt and less can be measured practically without an error.

The resistance of the output circuit does not affect the measurement so that one of the instruments 6 or 7 may be removed or they may be used a long way from the amplifier and the resistance of the connecting wire is changed by change of temperature. In all such cases a minute increase or decrease of the light spot on the photo-cell will re-establish the necessary current and balance the voltage of the thermocouple.

The large output of the valve is chosen, since more than 30mw. is necessary to operate a powerful movement, in order to make the standard output of the valve large compared to the power, necessary for the movement. The high slope is needed to make the arrangement sensitive. A small deflection of the galvanometer and, therefore, a small increase in the light on the photocell must be sufficient to change the output of the valve to a large extent. The small grid current is even more important than the high slope and the large output. If the grid current is not kept very small, the amplifier becomes unstable over part of the scale and, therefore, useless. The grid current can, thereby, be caused by small amounts of gas in the tube, grid emission and leakage. It can easily be seen that if grid current amounts to appreciable proportions the working of the amplifier is impaired. The qualities of a gas filled valve avoids the effects of the grid current entirely. The slope, or what is represented as slope in such a valve, is higher than anything obtained with a single hard valve. At the same time, the output is much larger.

The output of the amplifier is, of course, limited by the type of valve. If it becomes very large, then a small gas discharge valve may control a larger one but a hard valve with the qualities mentioned before may be used for the same purpose. In order to increase the sensitivity and, thereby, the accuracy of the amplifier, a highly sensitive and well damped galvanometer is preferably used. At the same time, a larger distance between the galvanometer and the photo-cell may be chosen whereby, however, the power of the necessary lamp increases tremendously with the lengthening of the distance.

Of equal importance is the choice of the grid voltage. If this voltage is adapted to the rest of the circuit, the arrangement may be made so sensitive that if the width illuminated on the photo-cell is only $\frac{1}{50}$" the full output current is already reached. A potentiometer of high resistance across the terminals 17 makes it possible to adapt this voltage exactly to the specific qualities of the photo-cell and the other parts. A limit stop on the galvanometer prevents it from passing beyond the point where the output from the valve is at a maximum. The lamp, as well as the valve and the photo-cell, are preferably under-run so as to increase their useful life to more than 1000 hours. The voltage supplied to the lamp is reduced by some percentage of its rated voltage, say by 10 per cent, and whilst this increases the life of the lamp it may seem that it will reduce the sensitivity of the arrangement to a large extent. This is not the case, since the photo-cell has its highest sensitivity in the red part of the spectrum. By reducing the voltage supplied to the lamp, this part of the spectrum is affected much less than other components and it is, therefore, possible to reduce the voltage without the loss of much sensitivity. The use of these two means, a reduced voltage and a red sensitive cell has, therefore, the combined effect of the increased life-time without much loss of sensitivity. It also follows, since the amplifier is stable over its whole output range, that it is possible also to under-run the valve without disadvantage.

The photo-cell is preferably an argon filled caesium-layer on silver oxide type of cell which gives very good results. It is, however, an advantage to take one electrode out on the top of the photo-cell, thereby increasing the insulation between cathode and anode (glass insulation).

An amplifier, as described, can be laid out in two ways. The design hereindescribed works as the description shows, in such a way that when the light on the photo-cell increases, the anode current increases as well. This arrangement has many advantages but there is no difficulty in laying out the design in such a way that the anode current is at zero when the full amount of light is on the photo-cell. It has been explained, that by feeding back from the valve circuit into the input circuit, the amplifier is stabilised, and that a highly sensitive galvanometer should be used. It is difficult to comply with both conditions at the same time for a self-exciting circuit is obtained and a sensitive galvanometer easily starts oscillating.

A special feature of the amplifier is that to reduce possible oscillations, the current which is fed back is not smoothed out. In other words, the peak current is fed back. The mean D. C. which is fed back and compensates for the input current must for similar reasons be smaller than 1 milliamp. This, of course, does not mean that the current actually flowing through the galvanometer is as large as that. It only means that the theoretical, but in reality non-existent, input current and the theoretical current which compensates for it should be smaller than this amount. The actual current is made up by the difference of these two currents and its size depends upon the sensitivity of the galvanometer. There is, of course, a connection between the sensitivity of the galvanometer and the maximum current, as a less sensitive galvanometer permits a larger current without oscillating. The value of 1 milliamp. is chosen for a taut suspended galvanometer having a string length of 2" to 3".

As shown in Figure 1, the cathode of the photocell is connected to the grid. This has proved to give a very efficient and sensitive arrangement.

The use of a photo-cell with a condenser is especially satisfactory for A. C. mains supply. It may be pointed out that the photo-cell parallel to the grid, as shown in this design, has many advantages in that it is in series with the condenser which is fed by the secondary windings of the transformer.

The two instruments 6 and 7, shown in Figure 1, are only one possible example. The present amplifier solves the problem of how a temperature measured with a thermo-couple (or any physical value dependent on electro-motive force) when measured by an automatic potentiometer can be reproduced in more than one place. In other potentiometers one has to rely on repeating gear to achieve this end. The use of the new amplifier makes it possible to have one instrument 6 in the workshop and the other instrument 7 in an office or on a central switchboard.

The amplifier is primarily intended for measuring D. C. but if A. C. of low frequency has to be measured a known D. C. bias has to be used. The frequency of the galvanometer must then be high and a high speed recorder is necessary if a distortion of the recorded curves is to be avoided.

A more detailed circuit similar to Figure 1 is shown in Figure 2. The terminals A and B of this amplifier have to be connected to the thermo-couple or to the voltage to be measured. C goes to the case and to earth. D and E have to be connected to the instruments measuring the output current. The main supply may be connected to FG on one side, to HIJ on the other side, whereby it is possible to adjust the amplifier to any voltage between 200 and 250 volts. K and L should be connected to a resistance thermometer measuring the temperature of the cold junctions of the thermo-couples, providing for an automatic compensation in the case of the variation of this temperature. The standard resistance 3 in Figure 1 is replaced by a set of resistances 3a, 3b, 3c, 3d and the potentiometer switch 18. The use of a switch permits the changing of the amplification factor of the amplifier according to the voltage which has to be measured. The resistances 19 and 20 are provided for the adjustment of input and output circuit. For resistance 21 a high value of 10,000 ohms is chosen. It limits the amplifier current when the thermo-couple is disconnected. The arrangement of the transformer 4 and the gas discharge valve 5 remains unchanged. The photo-cell 8 is fitted with a mask 22 and the light coming from the lamp 10 passes through the lens 23 and, after being reflected by the mirror of the galvanometer 2, falls on the mask if the galvanometer is in its zero position. Part of the lens 23 is darkened and the segment of the circle which would be reflected on to the photo-cell is, therefore, cut away, giving the light spot a sharp edge of considerable length, parallel to the screen 22. The slightest movement of the galvanometer mirror gives a slit of light of the whole length of the photo-cell, thereby using to the utmost the capacity of the arrangement. The screen 22 can be conveniently used for the adjustment of the position of the galvanometer if that is at all necessary by simple rotation thereof. Even the maximum deflection of the galvanometer in this arrangement is so small that an adjustment of zero is necessary only if very small voltages have to be measured.

The condenser 13 and the choke 14 are provided as in Figure 1. The resistance 15 limits the condenser peak current and impedes irregular triggering. The thermo-relay 16 remains unchanged. To eliminate radio disturbances another small condenser 24 and a choke 25 are provided. The condenser 26 is necessary as there is always a likelihood of the thermo-couple connected to A and B being earthed and, therefore, a small D. C. voltage between the two earthed points may disturb the working of the amplifier. The condenser 26 may be replaced by a high resistance and/or a choke. To check the calibration of the instruments used in the output circuit a standard cell 27 is provided. The standard cell is not only useful for the re-calibration of ordinary instruments but it becomes especially important if instruments with suppressed zero are used, the zero setting of which cannot be controlled otherwise.

The rectifier 28 is connected to a secondary winding of the transformer 4 and the bridge arrangement 29, which is provided for the compensation of the change of temperature of the cold end of the thermo-couple connected to AB. The first circuit of the amplifier is taken through the resistance 30a which is a part of the diagonal of the bridge. If the resistance of the four parts of the bridge are equal, no current is flowing through this part and the voltage of the thermo-couple is measured without being influenced. If, however, the resistance thermometer connected to the terminals K and L is exposed to a change of temperature, its resistance changes and then a small current begins to flow through the resistance 30a and the drop of voltage compensates the effect of the change of the temperature on the cold ends of the thermo-couple. Resistances 30b and 30c provide for thermo-couples with different characteristics. The resistance 31 can be adjusted in such a way as to balance the bridge circuit at the standard temperature chosen. As the compensating voltage is usually very small, fluctuations of mains supply voltage have no practical influence on the accuracy of the measurement; in some cases, however, the compensating circuit may be fed from a battery.

The amplifier is not only very useful in scientific laboratories and laboratories of industries where there are no vibrations, but it has to be used to a large extent in the workshops themselves. Provision must, therefore, be made to eliminate vibrations reaching the galvanometer as any sensitive galvanometer may pick up vibrations. These frequencies may be amplified under unfavourable circumstances and reproduced in the recorder or any instrument in the output circuit. To eliminate these vibrations the galvanometer 2, the lamp 10 and the photo-cell 8 are mounted together on a plate. The plate itself is mounted on cushions of rubber sponge or similar material, absorbing vibrations. Bolts and nuts are provided for fixing the plate in the case for transport purposes. When the instrument is in use, the nuts are lifted and spot holes for the bolts in the plate 33 are large so that no metallic connection exists between the plate and the case. Therefore, vibrations will not get through to the galvanometer. The supporting plate may alternatively be suspended on steel springs.

The construction of the galvanometer itself influences the possibility of vibrations considerably. Pivoted instruments are the least sensitive against against vibrations but the current sensitivity of these instruments is very small. Suspended coil galvanometers with one or two bearings give good results. The best results, however, are obtained with instruments with pole pieces and with taut suspended coil if the string of the instruments is made so taut that 10-15% is lost compared with an instrument with a looser "taut" suspension.

For an industrial instrument it would be inconvenient if the amplifier stopped working unexpectedly by a failure of the valve or by the diminishing light of the photo-cell. The ageing process of the lamp, the photo-cell and the valve is, however, slow. Therefore, the photo-cell may be fitted with a white knob. This knob can be observed from the outside of the amplifier through a small glass window. As long as light is falling on this knob there is a large reserve of useful life left in every part of the amplifier. As this reserve diminishes, the light on the photo-cell increases and after some time the light spot passes the knob and it becomes dark. When this happens it is time to exchange the valve (as the life-time of the photo-cell and the lamp can be made very long without any difficulty). If, after exchanging the valve, the light does not fall on the knob again, then an exchange of the lamp and the photo-cell has to be tried.

To keep the temperature within the case down the heat generated by the valve 5 and the transformer 4 is removed by a ventilation system and their suitable arrangement in a separate part of the case.

If the amplification is very large, the galvanometer 2 and the lamp 10 may be mounted outside the amplifier case on the wall to enlarge the distance between photo-cell and galvanometer. In this case, galvanometers of the highest sensitivity can be used and any current which can be measured with a highly sensitive galvanometer can be amplified to such an extent that an ink recorder, controller or motor can be used for its measurement.

In the foregoing, the use of an A. C. source of supply has been described and a modification thereof for use with D. C. mains supply will now be described with reference to Figure 3 which shows a circuit similar to that in Figure 2 so that only the changes therein will be described.

The gas filled valve 5 is replaced by two hard valves, of which the one valve 40 which is a small triode is selected for its high grid insulation, while the other valve 41 is a power valve. The condenser 9 is replaced by a high resistance 43. The resistance 44 makes it possible to adjust the sensitivity of the amplifier. A condenser 54 is provided for smoothing purposes. The remaining resistances 45, 46 and 47 are necessary for the adjustment of the different circuits. The resistances 48, 49, 50, 51, 52 and 53 are equivalent to the transformer 4 in the case of A. C. mains supply. The action of the circuit is similar to the circuit described in Figure 2. There is, however, a difference in the working of the valves. Both valves 40 and 41 are biased so that no anode current is flowing. There is, therefore, no potential drop across the resistance 42. If the illumination on the photo-cell 8 increases by the movement of the galvanometer 2, the current flowing through the high resistance 43 decreases the negative potential on the grid of the valve 40. This causes anode current to flow so that the cathode potential and, hence, the grid of the valve 41 becomes more positive. Anode current will then flow in the valve 41 and the drop of voltage on the resistance 3 will balance the voltage on the terminals A, B. The voltage amplification obtained from the valve 40 will be approximately 1, this value being virtually independent of the characteristics of the valve 40 and the value of the resistance 42. It is sometimes required that a certain amount of light may reach the photo-cell before any output is obtained, in which case the bias of valve 40 may be increased beyond the cut off point of this valve. No output will then be obtained until the cut off point has been passed. The heater circuits of the valves, in the described circuit, have been used as a stabilised source of grid bias and photo-cell potential. The smoothing of the screen circuit of the power valve is sufficient to provide a steady operation on the roughest D. C. main.

It will be understood that the described circuit is only an example and that it can be modified according to the current which has to be measured, to the valves chosen and to the values of the supply. For the measurement of small D. C. voltages of about 10 millivolts, to give an output of 30 milliamps. and using a mains supply of 230 volts, the resistance 42 can be chosen with 250,000 ohms, the resistance 43 with 50 megohms, the resistance 44 with 150 ohms, the resistance 45 with 550 ohms, the resistance 46 with 100 ohms and the resistance 47 with 10,000 ohms. The condenser 54 may be chosen with approximately 4 microfarads. The circuit for the compensation of the voltage of the temperature of the cold junction may be fed from the battery 55 if the voltage to be measured is very small and the fluctuations of the main supply might influence the result of the measurement. The battery 55, therefore, replaces the special windings of the transformer supplying the circuit in Figure 2.

I claim:

1. In an amplifier for small direct currents and voltages, an incandescent electric lamp, a source of power feeding said lamp, an input circuit, a highly sensitive highly damped suspension galvanometer employing a reflecting mirror and having pole pieces, said galvanometer being disposed in said input circuit, an output circuit, a gas filled valve comprising a grid, said valve being disposed in said output circuit, a photo-cell arranged in parallel to the grid of said gas filled valve, said galvanometer mirror being operatively disposed with respect to said lamp and photo-cell and being adapted to throw a varying beam of light from said lamp upon said photo-cell depending upon the position of the mirror, a condenser in series with the photo-cell, a resistance in series with and near to the anode of the valve, means for feeding back a small part of current from the output of the valve to the input circuit, means for controlling the output of current from said valve by stopping the flow of anode current over part of the positive half wave and by changing its peak value, means for smoothing out the output current which is not fed back, and means for supplying mains alternating current for operation of the amplifier.

2. In an amplifier for amplifying the small direct current voltage generated by a thermo-couple, an input circuit connected to said thermo-couple, a fixed resistance, a suspension galvanometer with a reflecting mirror, said resistance and galvanometer being disposed in said input circuit, a light source, an output circuit, a condenser, a photocell and a gas filled valve disposed in said output circuit, said photo-cell having a cathode and said valve having a grid, said photo-cell being in series with said condenser and said gas filled valve having its grid connected in parallel with the cathode of said photo-cell, means for feeding back part of the current from the output to the input circuit, means for controlling the output of current from said valve by stopping the flow of anode current over part of the positive half wave and by changing its peak value, means for smoothing out the output current which is not fed back, and a source of mains supply of alternating current.

3. In an amplifier for amulifying the small direct current voltage generated by a thermo-couple, an input circuit connected to said thermo-couple, a fixed resistance, a suspension galvanometer with a reflecting mirror, said resistance and galvanometer being disposed in said input circuit, a light source, an output circuit, a condenser, a photo-cell and a gas filled valve disposed in said output circuit, said photo-cell having a cathode and said valve having a grid, said photo-cell being in series with said condenser and said gas filled valve having its grid connected in parallel with the cathode of said photo-cell, means for feeding back part of the current from the output to the input circuit, means for controlling the output of current from said valve by stopping the flow of anode current over part of the positive half wave and by changing its peak value, means for smoothing out the output current which is not fed back, a source of mains supply of alternating current, and mains fed means for compensating temperature change of the thermo-couple.

4. In an amplifier for small direct currents and voltages, a light source, a photo-electric cell, a light modulating galvanometer, means for conveying the current to be measured to said galvanometer to cause it to vary the light falling on said cell, a source of alternating current supply, a single gas filled triode valve, means for conveying the current from said cell to said valve to vary the output thereof, means for feeding back part of the valve output to the source of the small direct currents and voltages to be amplified and means for controlling the output of current from said valve by stopping the flow of anode current over part of the positive half wave and by changing its peak value.

5. In an amplifier for small direct currents and voltages, a light source, a photo-electric cell, a galvanometer with a reflecting mirror, means for conveying the current to be measured to said galvanometer to cause it to vary the light falling on said cell, a source of alternating current supply, a single gas filled triode valve comprising a grid and an anode, means for conveying the current from said cell to the grid of said valve to vary the output thereof, means for feeding back to the source of the small direct currents and voltages to be amplified a part of the output current without changing the phase thereof in such a way that the action of the fed back current will cause oscillations, means for controlling the output of current from said valve by stopping the flow of anode current over part of the positive half wave and by changing its peak value, and means for smoothing out the output current after the point of feed back.

6. In an amplifier for small direct currents and voltages, an incandescent electric lamp, a photo-electric cell, a galvanometer with a reflecting mirror, means for conveying the current to be measured to said galvanometer to cause it to vary the light from said lamp falling on said cell, a source of alternating current supply, a single gas filled triode valve, means for conveying the current from said cell to said valve to vary the output thereof, means for feeding back part of the unsmoothed output current from the valve to the source of the small direct currents and voltages to be amplified, means for controlling the output of current from said valve by stopping the flow of anode current over part of the positive half wave and by changing its peak value, and means for smoothing out the output current after the point of feed back.

7. In an amplifier for small direct currents and voltages, a light source, a photo-electric cell, a suspension galvanometer with a reflecting mirror, means for conveying the current to be measured to said galvanometer to cause it to vary the light falling on said cell, a source of alternating current mains supply, a single gas filled triode valve comprising a grid, a resistance in series with and near to the anode of the said valve, means for conveying the current from said cell to the grid of said valve to vary the output thereof, means for feeding back part of the valve output to the source of the small direct currents and voltages to be amplified, means for controlling the output of current from said valve by stopping the flow of anode current over part of the positive half wave and by changing its peak value, and means for smoothing out the part of the output current which is not fed back.

8. In an amplifier for small direct currents and voltages, a light source, a photo-electric cell, a highly sensitive, highly damped, galvanometer with a reflecting mirror, means for conveying the current to be measured to said galvanometer to cause it to vary the light falling on said cell, a source of alternating current mains supply, a single gas filled triode valve comprising an anode and a grid, means connecting said cell in parallel to the grid of said valve to vary the output thereof, a condenser in series with said cell, means for feeding back part of the valve output to the source of the small direct currents and voltages to be amplified, means for controlling the output of current from said valve by stopping the flow of anode current over part of the positive half wave and by changing its peak value, and means for smoothing out the output current after the point of feed back.

9. In an amplifier for small direct currents and voltages, a light source, a photo-electric cell, a galvanometer with a reflecting mirror, means for conveying the current to be measured to said galvanometer to cause it to vary the light falling on said cell, optical grids in the light path between the galvanometer and the source of light and the photo-electric cell respectively, a source of alternating current supply, a single gas filled triode valve, means for conveying the current from said cell to said valve to vary the output thereof, means for feeding back part of the valve output to the source of the small direct currents and voltages to be amplified, and means for controlling the output of current from said valve by stopping the flow of anode current over part of the positive half wave and by changing its peak value.

10. In an amplifier for small direct currents and voltages, a light source, a photo-electric cell, a galvanometer with a reflecting mirror, means for conveying the current to be measured to said galvanometer to cause it to vary the light falling on said cell, a source of alternating current supply, a single gas filled triode valve, means for conveying the current from said cell to said valve to vary the output thereof, means for feeding back part of the valve output to the source of the small direct currents and voltages to be amplified, means for controlling the output of current from said valve by stopping the flow of anode current over part of the positive half wave and by changing its peak value, and means for reducing the time during which anode current can pass.

11. In an amplifier for small direct currents and voltages, a light source, a photo-electric cell, a galvanometer with a reflecting mirror, means for conveying the current to be measured to said galvanometer to cause it to vary the light falling on said cell, a source of alternating current supply, a gas filled triode valve, means for conveying the current from said cell to said valve to vary the output thereof, means for feeding back part of the unsmoothed output current from said valve to the source of the small direct currents and voltages to be amplified, and means for controlling the output of current from said valve by stopping the flow of anode current over the first part of the positive half wave and by changing the phase of the peak in this part of the half wave.

12. In an amplifier for small direct currents and voltages, a light source, a photo-electric cell, a galvanometer with a reflecting mirror, means for conveying the current to be measured to said galvanometer to cause it to vary the light falling on said cell, a source of alternating current mains supply, a single gas filled triode valve, means for conveying the current from said cell to said valve to vary the output thereof, means for feeding back part of the output current of said valve to the source of the small direct currents and voltages to be amplified, means for starting the discharge of said valve at such point that the mean anode current fed through said means to the input compensates the input current, and means for smoothing the output current after the point of feed back.

13. In an amplifier for small direct currents and voltages, a light source, a photo-electric cell, a galvanometer with a reflecting mirror, means for conveying the current to be measured to said galvanometer to cause it to vary the light falling on said cell, a source of alternating current mains supply, a single gas filled triode valve comprising an anode and a grid, an inductance in series with the anode of said valve, a condenser in series with said photo-electric cell, means connecting said cell in parallel to the grid of said valve, means for feeding back to the source of the small direct currents and voltages to be amplified a part of the output current without changing the phase thereof in such a way that the action of the fed back current will cause oscillations, and means for controlling the output of current from said valve by stopping the flow of anode current over the first part of the positive half wave and by changing the phase of the peak in this part of the half wave.

14. In an amplifier for small direct currents and voltages, a light source, a photo-electric cell, a galvanometer with a reflecting mirror, means for conveying the current to be measured to said galvanometer to cause it to vary the light falling on said cell, a source of alternating current mains supply, a single gas filled triode valve comprising a grid, means for conveying the current from said cell to said valve to vary the output thereof, means for feeding back part of the valve output to the source of the small direct currents and voltages to be amplified, means for changing the magnitude of the bias on the grid of said valve and at the same time altering the phase of said bias to control the output current from said valve, and means for smoothing out the output current after the point of feed back.

15. In an amplifier for small direct currents and voltages, an incandescent electric lamp, a photo-electric cell, a highly sensitive, highly damped, suspension galvanometer with a reflecting mirror, means for conveying the current to be measured to said galvanometer to cause its mirror to vary the light from said lamp falling on said cell, a source of alternating current mains supply, a single gas filled triode valve comprising an anode and a grid, a resistance in series with and near to the anode of said valve, a condenser in series with said cell, means connecting said cell in parallel to the grid of said valve to vary the output thereof, means for feeding back part of the valve output to the source of the small direct currents and voltages to be amplified, means for controlling the output of current from said valve by stopping the flow of anode current over part of the positive half wave and by changing its peak value, and means for smoothing out the output current after the point of feed back.

16. In an amplifier for small direct currents and voltages, an incandescent electric lamp, a photo-electric cell, a galvanometer with a reflecting mirror, means for conveying the current to be measured to said galvanometer to cause it to vary the light from said lamp falling on said cell, a source of alternating current mains supply, a single gas filled triode valve comprising an anode and a grid, means for conveying the current from said cell to the grid of said valve to vary the output thereof, means for feeding back part of the unsmoothed output current from the valve to the source of the small direct currents and voltages to be amplified, means for controlling the output of current from said valve by stopping the flow of anode current over part of the positive half wave and by changing its peak value, means for reducing the time during which anode current can pass, and means for smoothing out the output current after the point of feed back.

17. In an amplifier for small direct currents and voltages, an incandescent electric lamp, a photo-electric cell, a sensitive damped galvanometer with a reflecting mirror, means for conveying the current to be measured to said galvanometer to cause its mirror to vary the light from said lamp falling on said cell, a source of alternating current mains supply, a single gas filled triode valve comprising a grid, a condenser in series with said cell, means connecting said cell in parallel to the grid of said valve to vary the output thereof, means for feeding back to the source of the small direct currents and voltages to be amplified a part of the output current without changing the phase thereof in such a way that the action of the fed back current will cause oscillations, means for starting the discharge of said valve at such point that the mean anode current fed through said means to the input of said valve compensates the input current, means for reducing the time during which anode current may flow, and means for smoothing the output current after the point of feed.

18. In an amplifier for small direct currents and voltages, a primary circuit including a source of current and a light modulating galvanometer; a photo-electric cell, a source of light operatively associated with said galvanometer for illuminating said photo cell in dependence upon the position of the galvanometer, a secondary circuit including a source of alternating current supply and a single gas filled valve having a grid; means for coupling said primary and said secondary circuits, means for feeding the output of the photo-electric cell to the grid of the valve, and means for feeding the output from said valve through said coupling means.

19. In an amplifier for small direct currents and voltages, a primary circuit including a source of weak current and a mirror reflecting light galvanometer; a single photo-electric cell, an electric lamp operatively disposed with respect to the galvanometer mirror for illuminating said photo-cell by means of said mirror in dependence upon the position of the galvanometer, a secondary circuit including a source of alternating current mains supply, a single gas filled triode valve and means for smoothing the output current; said valve comprising a grid, resistance means for coupling said primary and said secondary circuits, means for feeding the output of the photo-electric cell to the grid of said valve, and means for feeding the unsmoothed output from said valve through said coupling resistance.

20. A device adapted for amplification of small direct currents and voltages and recalibration of electric measuring instruments used in connection with said device, comprising, in combination, a current source, a standard cell, a primary circuit including a light modulating galvanometer; a photoelectric cell, a source of light operatively associated with said galvanometer for illuminating said photo-cell in dependence upon the position of the galvanometer, a secondary circuit including a source of alternating current supply and a gas filled valve having a grid; coupling means interconnecting said primary and secondary circuits, switch means for connecting either said current source or said standard cell to said primary circuit, connecting means disposed in said secondary circuit and adapted for connection to an electric measuring instrument, means for feeding the output of the photoelectric cell to the grid of the valve, and means for feeding the output from said valve through said coupling means, whereby, upon connection of said current source to said primary circuit by means of said switch means, the currents and voltages produced by said current source will be amplified, whereas a measuring instrument connected to said connecting means may be recalibrated by means of said standard cell by connecting the latter by said switch means to the primary circuit, while disconnecting said current source therefrom.

FRITZ LUDWIG STEGHART.